United States Patent
Nagata

(10) Patent No.: US 8,899,184 B2
(45) Date of Patent: Dec. 2, 2014

(54) PRIMATE RESTRAINT DEVICE

(75) Inventor: Ryoichi Nagata, Kagoshima (JP)

(73) Assignee: Shin Nippon Biomedical Laboratories, Ltd., Kagoshima (JP)

( * ) Notice: Subject to any disclaimer, the term of this patent is extended or adjusted under 35 U.S.C. 154(b) by 36 days.

(21) Appl. No.: 13/389,362

(22) PCT Filed: Aug. 6, 2010

(86) PCT No.: PCT/JP2010/063362
§ 371 (c)(1),
(2), (4) Date: Apr. 11, 2012

(87) PCT Pub. No.: WO2011/016546
PCT Pub. Date: Feb. 10, 2011

(65) Prior Publication Data
US 2012/0186532 A1    Jul. 26, 2012

(30) Foreign Application Priority Data
Aug. 7, 2009 (JP) ................................. 2009-184257

(51) Int. Cl.
*A01K 31/10* (2006.01)
(Continued)

(52) U.S. Cl.
CPC ................ *A61D 3/00* (2013.01); *A01K 1/0613* (2013.01); *A01K 1/031* (2013.01)
USPC ........... 119/481; 119/452; 119/473; 119/729; 119/815; 119/732; 119/752

(58) Field of Classification Search
CPC ....... A01K 1/031; A01K 1/03; A01K 1/0245; A01K 1/0035; A01K 1/0272; A01K 15/04; A01K 1/0017; A01K 1/06
USPC ......... 119/481, 712, 416, 420, 421, 452, 453, 119/473, 472, 482, 496, 507, 729–736, 119/738–750, 752, 757, 815, 824; D30/114, 116
See application file for complete search history.

(56) References Cited

U.S. PATENT DOCUMENTS 275,969 A * 4/1883 Woodside ........................ 217/36
328,817 A * 10/1885 Scrafford ....................... 119/735
(Continued)

FOREIGN PATENT DOCUMENTS

JP        7-147862 A    6/1995
JP        8-24506 B2    6/1995
(Continued)

OTHER PUBLICATIONS

Nagata et al., "Improvement of Purchased Monkey Chair for Experiments of Brain Higher Function", Annual Report of the Technical Division of National Institute of Physiological Sciences, No. 10, Oct. 1, 1995, pp. 40-43.(Cited in International Search Report dated Oct. 26, 2010.)

(Continued)

*Primary Examiner* — Andrea Valenti
(74) *Attorney, Agent, or Firm* — Westerman, Hattori, Daniels & Adrian, LLP

(57) ABSTRACT

A primate restraint device capable of restricting the movement of a monkey and, particularly, capable of facilitating transnasal intragastric administration or oral administration. A primate restraint device comprising: a containing body having both side surfaces, a top surface, and a bottom surface; a door provided to the rear surface side of the containing body and capable of opening and closing the rear surface side of the containing body by sliding up and down; and a partition wall which is formed so as to close the inside of the containing body from the front surface side and to be movable forward and backward within the containing body and which is configured to be able to be affixed at a desired position within the containing body. Both side surfaces are each formed by combining vertical bar members and horizontal bar members into a grid pattern, and at least some of the horizontal bar members of the side surface are curved downward to form chin support sections on which the chin of the contained primate is supported.

5 Claims, 3 Drawing Sheets

(51) Int. Cl.
*A01K 15/04* (2006.01)
*A01K 13/00* (2006.01)
*A61D 3/00* (2006.01)
*A01K 1/06* (2006.01)
*A01K 1/03* (2006.01)

(56) References Cited

U.S. PATENT DOCUMENTS

| | | | | |
|---|---|---|---|---|
| 1,114,094 | A * | 10/1914 | Apple | 119/735 |
| 2,650,567 | A * | 9/1953 | Whitworth | 119/733 |
| 3,028,839 | A * | 4/1962 | Crook et al. | 119/678 |
| 3,918,406 | A * | 11/1975 | Patterson | 119/473 |
| 4,770,127 | A * | 9/1988 | Volk | 119/473 |
| 4,991,543 | A * | 2/1991 | Silberman | 119/473 |
| 5,044,317 | A * | 9/1991 | Shean et al. | 119/472 |
| 5,233,939 | A * | 8/1993 | Randolph | 119/473 |
| 5,571,241 | A * | 11/1996 | Nagata | 119/473 |
| 6,062,172 | A * | 5/2000 | Long et al. | 119/712 |
| 6,513,459 | B2 * | 2/2003 | Linn | 119/729 |
| 7,162,977 | B1 * | 1/2007 | Charvat | 119/751 |
| 2009/0090303 | A1 | 4/2009 | Osada et al. | |

FOREIGN PATENT DOCUMENTS

| | | |
|---|---|---|
| JP | 11-9129 A | 1/1999 |
| WO | 2007/034588 A1 | 3/2007 |

OTHER PUBLICATIONS

Togawa et al., "Prototype of Monkey Chair for experiments of Brain Higher Function", Annual Report of the Technical Division of National Institute for Physiological Sciences, No. 9, Sep. 1, 1994, pp. 50-53.(Cited in International Search Report dated Oct. 26, 2010.)

Kamimura, "About Training as to Treatment of Primates in the Primate Research Institute, Kyoto University", Japanese Association for Experimental Animal Technologists Hokkaido Shibu Kaishi, No. 21, Sep. 1, 1997, pp. 23-26.(Cited in International Search Report dated Oct. 26, 2010.)

International Search Report of PCT/JP2010/063362, mailing date of Oct. 26, 2010.

International Preliminary Report on Patentability (Form PCT/IB/373) of International Application No. PCT/JP2010/063362 mailed Mar. 13, 2012 with Form PCT/ISA/237.

* cited by examiner

PRIMATE RESTRAINT DEVICE

TECHNICAL FIELD

The present invention relates to a restraint device used in an experiment for examining efficacy of a pharmaceutical product or similar by using primates. The present invention relates in particular to a restraint device which restricts the movement of primates and while conducting oral administration or transnasal intragastric administration.

BACKGROUND ART

In the development of pharmaceutical products to be used in medical examination of human beings or treatment of diseases, in order to examine in advance how the drug influences human bodies, the drug needs to be administered to animals to confirm the efficacy.

As such, laboratory animals, mice, rats, dogs, rabbits, monkeys and many other animals are used. However, in order to examine efficacy of the drug to be administered to a human being most accurately, the use of primates (hereinafter referred to as "monkeys") is optimal.

In order to perform oral administration, transnasal intragastric administration, or intravenous injections of drugs to a monkey, to collect blood therefrom, to examine the state of pupils thereof, or to hold the head thereof in case of need, it is necessary to restrain the monkey so that the monkey cannot move freely. Thus, as a restraint device which restrains the movement of the monkey and facilitates work, a restraint device as shown in Patent Document 1 has been proposed.

PRIOR ART

Patent Document

Patent Document 1: JP 08-24506 B

SUMMARY OF INVENTION

Problems to be Solved by the Invention

With regard to the above-described conventional restraint device, attention has been paid only to restricting the movement of a monkey, and consideration has not been given to the treatment to be performed thereafter. For example, no particular consideration has been given to convenience during oral administration or transnasal administration.

Thus, the objective of the present invention is to provide a primate restraint device which can restrict the movement of a monkey while facilitating oral administration or transnasal intragastric administration.

Means to Solve the Problem

The present invention was made to solve the above-mentioned problem and is characterized as follows.

The primate restraint device according to the present invention has a containing body having both side surfaces, a top surface, and a bottom surface; a door provided on the rear surface side of the containing body and capable of opening and closing the rear surface side of the containing body by sliding up and down; and a partition wall formed so as to close the inside of the containing body from the front surface side and to be movable forward and backward within the containing body and configured to be able to be fixed at a desired position within the containing body; and each of both side surfaces is formed by assembling vertical bar members and horizontal bar members into a grid pattern, and a chin support portion on which a chin of a contained primate is placed by at least a part of the horizontal bar member being curved downward.

Here, the "front surface" in the present invention refers to the face near to a worker facing the restraint device. Further, the "rear surface" refers to a face opposite to the front surface, that is, the face far from the worker facing the restraint device.

Further, the "containing body" has wall surfaces, that is, both side surfaces, the top surface, and the bottom surface. In other words, in the basic mode, the containing body is formed in a substantial box shape with the front surface and the rear surface open. However, the containing body according to the present invention is not limited to the mode that has the front surface and the rear surface completely open. That is, it is only necessary that the rear surface side is capable of being open to such a degree that it can be used at least as an entrance for a monkey. Moreover, the front surface side is preferably open, considering ease of a work and the like, but, as embodiments of the present invention, is not limited to the open mode. For example, a mode in which part of the front surface side or the rear surface side is not open by providing a member for reinforcing the structure of the containing body or similar on the front surface side or the rear surface side is possible.

At least each of both side surfaces among the wall surfaces of this containing body is formed by assembling vertical bar members and horizontal bar members into a grid pattern. The term "grid pattern" here may be such that vertical bars and horizontal bars are fixed so as to intersect each other at right angles and to form wall surfaces, and it does not have to be a grid pattern in the strict sense, in which the bar members are arranged at equal intervals. That is, the mode in which a part of the vertical bars or horizontal bars are fractured is also included.

Moreover, the "door" is provided on the rear surface side of the containing body and is capable of opening and closing the rear surface side of the containing body by sliding up and down. That is, by opening this door, a monkey can be contained from the rear surface side of the containing body. Further, by closing the door, the contained monkey can be locked up within the containing body.

The "partition wall" is formed movably forward and backward within the containing body while closing the inside of the containing body from the front surface side. Further, this partition wall can be fixed at a desired position within the containing body. By forming the partition wall as above, this partition wall can be moved forward and backward within the containing body and limit the range of a contained monkey to move. Specifically, by moving the partition wall to the rear surface side after the monkey is contained, the contained space of the monkey in the containing body is narrowed and the movement of the monkey can be restricted. Further, since this partition wall can be fixed at a desired position within the containing body, it can be fixed in a state wherein the movement of the monkey is restricted. It is only necessary that the fixation of the partition mentioned here can at least obstruct movement of the partition wall in a direction that enlarges the contained space of the monkey and the movement of the partition wall in a direction to narrow the contained space of the monkey, and that these fixations may be made freely. Specific means for fixing the partition wall may include arbitrary means such as a known latch structure, for example.

Further, the "chin support portion" is formed by curving at least a part of the horizontal bar member constituting both side surfaces of the containing body downward, and the chin of the contained monkey is placed on this. In other words, at least one grid formed on the side surface of the containing body has such a size that the head of the contained monkey can protrude to the outside of the containing body, and by curving the bar member forming the bottom side of the grids downward, the chin support portion according to the present invention is formed. As a result, when the head of the contained monkey is made to protrude to the outside of the containing body, the chin of the monkey can be easily fixed on the chin support portion.

This chin support portion can be provided at an appropriate position, considering the relative sizes of the containing body and the monkey to be contained and the like. Specifically, the height of the chin support portion is preferably provided exactly at the height of the chin position when the movement of the contained monkey is restrained by the partition wall. Further, the longitudinal position of the chin support portion is preferably provided in the vicinity of the rear surface side of the containing body so as to be in contact with the door. That is, if the partition wall is moved to the rear surface side so as to restrict the movement of the monkey, the head of the monkey is located at the position in contact with the door. The present invention does not particularly limit the number of chin support portions. For example, a plurality of chin support portions may be provided in order to accommodate various sizes of monkeys.

Effect of Invention

The present invention is as described above and can restrict the movement of a monkey by moving and fixing the partition wall. Furthermore, since there is a chin support portion on which the chin of the contained monkey is placed, the head of the contained monkey can be easily fixed, and particularly, the present invention has the effect that oral administration or transnasal intragastric administration can be performed easily.

MODE FOR CARRYING OUT THE INVENTION

An embodiment of the present invention will be described by referring to FIGS. 1 to 3.

Figure 1:
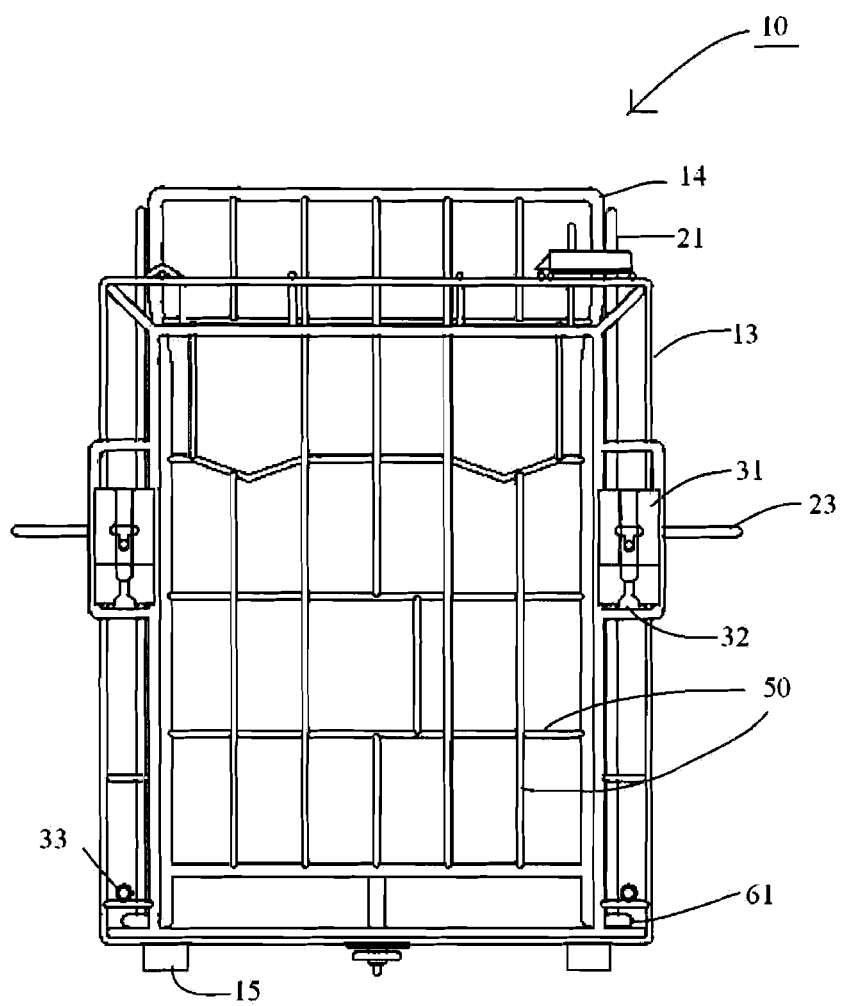
FIG. 1 is a front view of a restraint device, which is an embodiment of the present invention.

In FIG. 1, among essential members constituting a restraint device 10 according to this embodiment, a containing body 13 and a slide shutter 14 are illustrated but a sandwiching body 12 is not illustrated for ease of understanding. In fact, the sandwiching body 12 is mounted also in an area corresponding to FIG. 1.

(Restraint Device 10)

Figure 2:
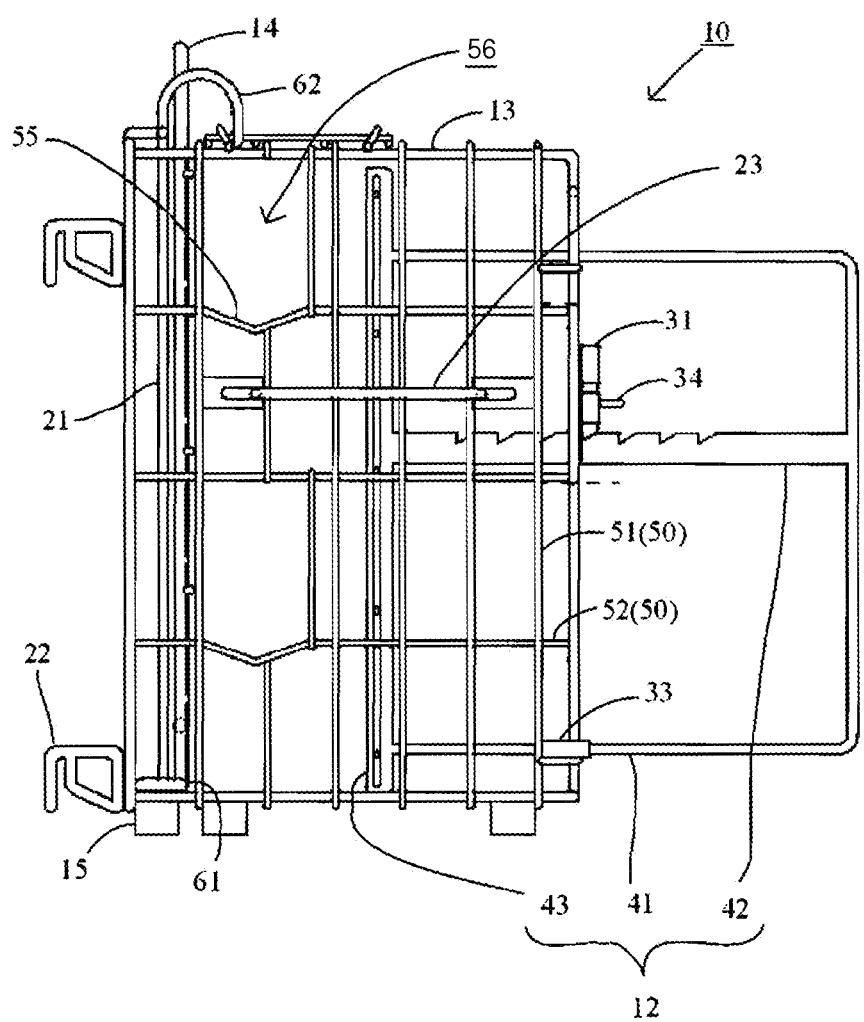
FIG. 2 is a side view of a restraint device, which is an embodiment of the present invention.

The restraint device 10 according to this embodiment is, as illustrated in FIG. 2, constituted of the containing body 13, the slide shutter 14, and the sandwiching body 12 as its essential members. Further, as illustrated in FIGS. 1 and 2, the restraint device 10 according to this embodiment forms a box-shaped cage by the containing body 13, the slide shutter 14, and the sandwiching body 12.

(Containing Body 13 and Slide Shutter 14)

As illustrated in FIG. 1, in the containing body 13 are formed its both side surfaces, top surface, and bottom surface by forming the wall surfaces by assembling bar members 50 in a grid pattern, but the front surface and the rear surface are open.

Further, on the rear surface side is provided the slide shutter 14 capable of opening and closing the rear surface side of the containing body 13 by sliding up and down. The upper end of this slide shutter 14 protrudes above the containing body 13 and it is formed so as to be pulled up easily.

This slide shutter 14 closes the rear surface side of the containing body 13 in the state shown in FIGS. 1 and 2, but by pulling it up as described below, the rear surface side of the containing body 13 can be left open. That is, as illustrated in FIG. 2, in the containing body 13, bar-shaped shutter guide members 21 are installed upright corresponding to each of right and left support columns of the slide shutter 14 in parallel with the respective support columns Further, the lower end portion of the slide shutter 14 forms a ring portion 61, and by inserting the shutter guide member 21 through a hole of this ring portion 61, the slide shutter 14 can be made to slide upward along the shutter guide member 21. Moreover, the upper end of the shutter guide member 21 is curved in the inverse U-shape and forms a curved portion 62. Thus, if the ring portion 61 of the slide shutter 14 reaches this curved portion 62 as the result of pulling up the slide shutter 14, the slide shutter 14 can be placed while overlapping with the upper part of the containing body 13 by pulling down the upper part of the slide shutter 14 to the front side. As a result, the rear surface side of the containing body 13 can be kept in an open state, through which work can be performed freely.

It is assumed that this restraint device 10 is to be used mounted on a horizontal bar of a front grid of a cage in which a monkey is kept. Thus hooks 22 are provided at appropriate positions on an upper part and a lower part of the rear surface of the containing body 13. That is, by hooking these hooks 22 on the horizontal bars on the front grid of the cage, the restraint device 10 can be fixed to the cage. Further, since a door as an entrance for a monkey is provided on the front surface of the cage, by fixing the restraint device 10 to the cage and by leaving the door to the cage and the slide shutter 14 open, the inside of the cage links with the inside of the restraint device 10, and the monkey in the cage can move to the restraint device 10.

Figure 3:
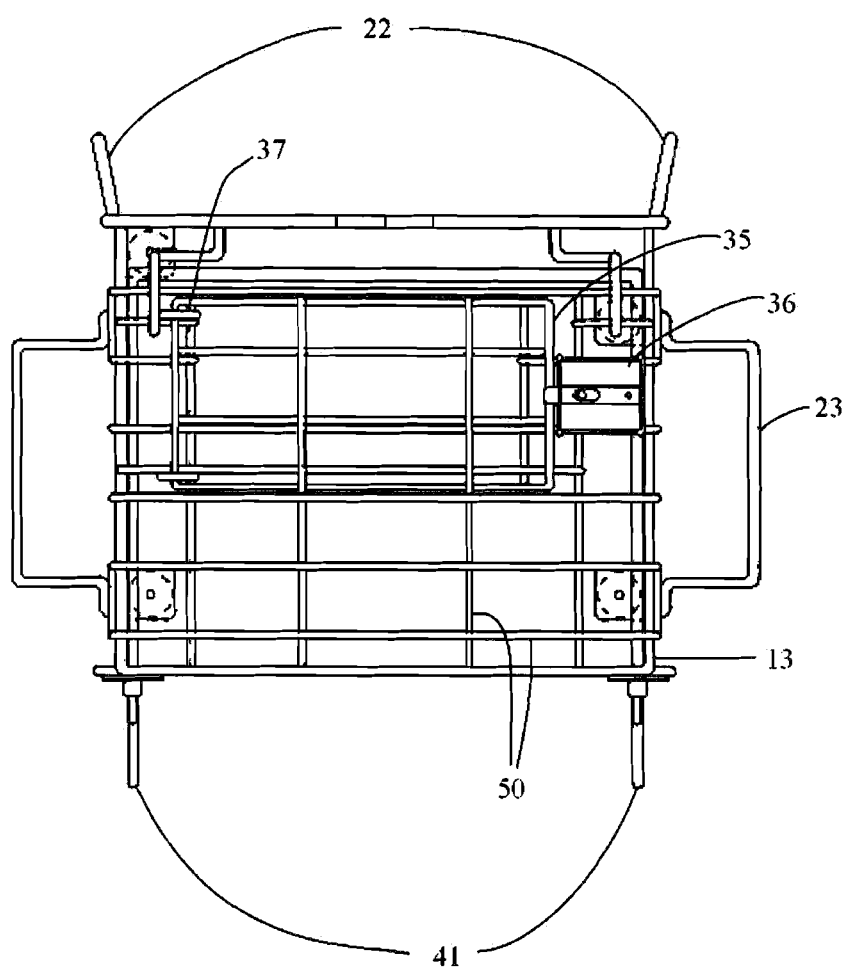
FIG. 3 is a plan view of a restraint device, which is an embodiment of the present invention.

FIG. 3 is a plan view of the restraint device 10 according to this embodiment when seen from above, and as illustrated in this FIG. 3, a top door 35 is provided on the top surface of the containing body 13 in order to approach the monkey contained in the restraint device 10 from above. This top door 35 is capable of being locked by a top-door lock device 36 so that the containing body 13 cannot be easily opened from the inside.

Moreover, transportation handles 23 are provided on both side surfaces of the containing body 13 so that the restraint device 10 can be moved easily.

Furthermore, leg portions 15 for placing the restraint device on the ground stably are provided on the bottom surface of the containing body 13.

(Sandwiching Body 12)

Subsequently, the sandwiching body 12 according to this embodiment will be described.

The sandwiching body 12 is mounted on the containing body 13 for narrowing the contained space of a monkey in the containing body 13 so as to restrict the movement of the monkey. This sandwiching body 12 has a partition wall 43 movable forward and backward within the containing body 13, a sandwiching body handle 41 used for a moving operation of the partition wall 43, and a latch member 42 for fixing the moved partition wall 43 within the containing body 13.

It is possible for the partition wall 43 to move forward and backward within the containing body 13 while closing the inside of the containing body 13 from the front surface side, and, furthermore, fixed to a desired position within the containing body 13. As illustrated in FIG. 2, the partition wall 43 is provided so as to partition the inside of the containing body 13 into the front part and the rear part. Though not shown in a figure, the wall surface of the partition wall 43 has a structure in which the bar members 50 are assembled in the grid pattern similarly to the wall surface of the containing body 13.

Further, on this partition wall 43, two sandwiching body handles 41, each having a U-shape when viewed from the side extending to the front side, are fixed on right and left when viewed from the front. Further, each of the lower sides of these two sandwiching body handles 41 is supported by a pipe-shaped sandwiching body handle support member 33 provided on the lower part of the containing body 13 for sliding. As a result, by pressing the sandwiching body handles 41 to the rear side, the partition wall 43 can be moved to the rear surface side, whereas by pulling the sandwiching body handles 41 to the front, the partition wall 43 can be moved to the front surface side.

Moreover, between an upper side and a lower side of each of the right and left sandwiching body handles 41, a plate-shaped latch member 42 is provided in parallel with them. Each of the latch members 42 is inserted into a latch member insertion port 32 provided in the containing body 13 so as to guide the front-back movement of the partition wall 43 frontward and backward and also plays a role of fixing the partition wall 43 at a desired position within the containing body 13. That is, in this latch member 42, saw-shaped teeth are formed on the upper face thereof and meshed with a key of a sandwiching body lock device 31 provided on the latch member insertion port 32. As a result, the partition wall 43 can freely move in the direction of the rear surface but cannot freely move in the direction of the front surface. If the partition wall 43 is to be moved in the direction of the front surface, it is only necessary to operate an unlock pin 34 of the sandwiching body lock device 31, and the partition wall 43 can be moved in a state in which the engagement between the teeth of the latch member 42 and the key on the sandwiching body lock device 31 is released.

(Chin Support Portion 55)

As described above, each of both side surfaces of the containing body 13 according to this embodiment is a wall surface in which the bar members 50 are assembled in the grid pattern. That is, as illustrated in FIG. 2, side surface vertical bars 51 bridged vertically and side surface horizontal bars 52 bridged horizontally are fixed so as to intersect each other and form a side surface.

Here, the side surface vertical bars 51 and the side surface horizontal bars 52 are arranged at substantially equal intervals, but in the vicinity of the rear surface of the containing body 13, the position of the side surface vertical bar 51 is shifted. That is, since the side surface vertical bar 51 is arranged with a slight shift to the front surface side, a wider grid than the other grids is formed in the vicinity of the rear surface of the containing body 13, and this wider grid forms a head protrusion port 56 through which the head of the monkey contained in the restraint device 10 is protruded to the outside.

Further, the side surface horizontal bar 52 constituting a lower side of the grid which forms this head protrusion port 56 is curved downward and forms a trough in the vicinity of the middle of this grid. That is, this curved side surface horizontal bar 52 forms the chin support portion 55 on which the chin of the monkey is placed.

In this embodiment, by providing the above-described head protrusion port 56 and the chin support portion 55, when the partition wall 43 is moved so as to restrict the movement of the monkey, the head of the monkey is made to protrude through the head protrusion port 56 and the chin of the monkey can be fixed on the chin support portion 55.

Although only one side surface of the containing body 13 is explained in the above description, the same chin support portion 55 is formed on the other side surface.

(Use Example)

A specific use example of this restraint device 10 is as follows.

First, the hooks 22 of the restraint device 10 are hooked on a lateral beam of the grid on the front surface of the cage which contains the monkey, and the restraint device 10 is fixed to the cage.

Further, the unlock pin 34 of the sandwiching body lock device 31 is operated so as to release the engagement between the key of the sandwiching body lock device 31 and the teeth of the latch member 42, and the sandwiching body handle 41 is pulled frontward. As a result, the partition wall 43 is moved to the front surface side, and it is ensured that the contained space for the monkey in the containing body 13 is sufficiently wide.

Subsequently, the slide shutter 14 is pulled upward, the upper side of the slide shutter 14 is pulled down to the front, and the slide shutter 14 is placed on the upper part of the containing body 13 in an overlapping manner. As a result, the rear surface side of the containing body 13 is opened. Further, the door of the cage is opened, and the insides of the cage and the restraint device 10 are linked to each other. In this state, the monkey is moved into the restraint device 10.

After the monkey is moved into the restraint device 10, the slide shutter 14 is pulled down, and the door of the cage is closed.

Further, by pressing the sandwiching body handle 41 to the rear side, the partition wall 43 is moved to the rear surface side. As a result, the contained space for the monkey in the containing body 13 is narrowed, and the movement of the monkey can be restricted. At this time, by letting the monkey face the rear surface direction, the monkey and the worker are prevented from facing each other, and the subsequent work can be performed smoothly.

After the movement of the monkey is restricted, the head of the monkey is held and pushed out toward the side surface side of the containing body 13 and can be protruded to the outside of the containing body 13 through the head protrusion port 56.

Then, since the chin of the monkey is held just on the chin support portion 55, the head of the monkey is fixed. Further, in this state, treatments such as oral administration, intragastric administration using a transnasal catheter or similar can be performed.

INDUSTRIAL APPLICABILITY

The present invention can be used as a restraint device used when testing efficacy of pharmaceutical products and similar by using primates.

The invention claimed is:

1. A primate restraint device comprising:
   a containing body having two side surfaces, a top surface, and a bottom surface, wherein each of said two side surfaces comprises a plurality of vertical bar members and a plurality of horizontal bar members which form a grid pattern;

a door provided on a rear surface side of said containing body through which a primate comes in and out of said containing body, wherein said door is capable of opening and closing said rear surface side of said containing body by sliding up and down, and wherein said rear surface side is connected perpendicularly to said two side surfaces;

a partition wall which closes an inside area of said containing body from a front surface side and is movable forward and backward within said containing body, wherein said partition wall is configured to be fixed at a desired position within said containing body; and a head protrusion port provided on at least one of said two side surfaces through which a head of a contained primate can protrude outside, wherein said head protrusion port comprises two adjacent vertical bar members having a distance therebetween which can accommodate said head of said contained primate, wherein said head protrusion port further comprises a chin support portion for placing a chin of said contained primate, wherein said chin support portion is a portion of a horizontal bar member which extends continuously across said at least one of said two side surfaces, wherein said portion of said horizontal bar member is between said two adjacent vertical bar members of said head protrusion port, wherein said portion of said horizontal bar member is curved downward in a V-shape such that said head protrusion port has a pentagonal shape, and wherein said distance between said two adjacent vertical bar members of said head protrusion port is wider than a distance between any other pair of said vertical bar members on said two side surfaces.

2. The primate restraint device according to claim 1, wherein said chin support portion is provided in a vicinity of said rear surface side of said containing body so as to be in contact with said door.

3. The primate restraint device according to claim 1, wherein said chin support portion is provided at same height as said chin of said contained primate, when said contained primate is restrained by said partition wall.

4. The primate restraint device according to claim 1, wherein one of said two side surfaces comprises a plurality of said chin support portions.

5. The primate restraint device according to claim 1, wherein each of said two side surfaces comprises a plurality of said chin support portions.

* * * * *